United States Patent [19]

Riddoch

[11] 3,794,845

[45] Feb. 26, 1974

[54] ELECTRICAL CONTROL SYSTEM

[75] Inventor: Henry Jameison Riddoch, Solihull, England

[73] Assignee: Girling Limited, Birmingham, England

[22] Filed: July 3, 1972

[21] Appl. No.: 268,828

[30] Foreign Application Priority Data
July 3, 1971 Great Britain.................... 31260/71

[52] U.S. Cl.................................. 290/38 R, 307/9
[51] Int. Cl............................................. F02n 11/08
[58] Field of Search...290/37, 38, 40 DIG. 1, DIG. 11; 307/9, 30, 118; 318/101, 103, 481

[56] References Cited
UNITED STATES PATENTS
3,489,912  1/1970  Hoffman, Jr............................ 307/9
3,514,621  5/1970  Farmer et al. .................... 290/37 R

*Primary Examiner*—Bernard A. Gilheany
*Assistant Examiner*—W. E. Duncanson, Jr.
*Attorney, Agent, or Firm*—Imirie and Smiley

[57] ABSTRACT

An electrical control system which is adapted to control both an electric pump in the hydraulic braking system of a motor vehicle and a control switch in the power supply to the starter motor in a manner dependent on the pressure in the braking system as sensed by a low pressure switch in the pressurised supply side of the pump so that if the pressure sensed by the pressure switch falls below a predetermined minimum level the control switch is operated to prevent energisation of the starter motor and the pump is started. The control system may be further adapted to respond in a manner dependent on operation of the motor vehicle engine and on the pressure as sensed by a second pressure switch is below a predetermined upper level the pump is operated until this upper pressure level is reached at which the second pressure switch operates and stops the pump. This upper pressure level corresponds to a normal acceptable braking force. The control system may be adapted to control the electric pump in an hydraulically powered brake anti-locking system, so as to maintain a predetermined minimum pressure therein. Typically, the control system is, adapted to give priority to the pump of the anti-locking system over the pump of the braking system.

9 Claims, 3 Drawing Figures

ELECTRICAL CONTROL SYSTEM

This invention relates to an electrical control system for controlling the starter motor and one or more hydraulic pumps in a motor vehicle in a predetermined manner under starting, normal operating and hydraulic failure conditions.

According to the present invention we propose an electrical control system for a motor vehicle comprising a vehicle starter motor; an electrically operated pump associated with a vehicle hydraulic braking system; switch means connected in the electrical power circuits of the starter motor and pump which normally serves to stop the pump and permit operation of the starter motor but can be operated to start the pump and prevent operation of the starter motor; first pressure sensing means which senses the hydraulic pressure produced by the pump in the braking system and which produces an output signal only when the hydraulic pressure sensed falls below a predetermined minimum level; and logic control means which has a first input connection from the first pressure sensing means to receive said output signal therefrom and which has output connection means to said switch means, the logic control means being such that it responds to said output signal at the first input connection by applying an output signal or signals through the output connection means to the switch means which operates the latter, thereby starting the pump and preventing operation of the starter motor.

Thus, the control system prevents the engine of a motor vehicle from being started and the vehicle driven away without a predetermined minimum hydraulic pressure in the braking system, this predetermined minimum pressure corresponding to a minimum safe braking force. Also, the control system operates the pump so that, providing there is not a hydraulic failure in the braking system, the pressure builds up to said predetermined minimum level at which said switch means operates to stop the pump and permit operation of the starter motor.

Preferably, a warning device such as a warning light is provided to indicate to the driver of the motor vehicle when the pressure in the braking system falls below said predetermined minimum level.

In a simple embodiment of the invention the switch means may be a simple two-way switch which is connected in the power circuits of both the starter motor and pump so as to permit operation of one or the other. In another embodiment of the invention the switch means may comprise individual switches which are connected in the power circuits of the starter motor and pump and are controlled by separate output signals from the logic control means. The switches themselves may be relays.

According to another feature of the invention the control system is further adapted so that the logic control means responds in a manner dependent on operation of the motor vehicle engine and on the pressure as sensed by a second pressure switch in the pressurised supply side of the pump so that once the engine is running, if the pressure sensed by the second pressure switch is below a predetermined upper level the pump is operated until this upper pressure level is reached at which the second pressure switch operates and stops the pump. This upper pressure level corresponds to a normal acceptable braking force. By these means, if the pressure in the braking system is below the predetermined minimum level before the vehicle engine is started, the pressure is built up in two stages, one of which occurs before the vehicle engine is started and the other of which occurs after the vehicle engine is started. In this way the motor vehicle battery which will normally power both the starter motor and the pump will not be drained of too much power by the pump before the starter motor is operated.

If when the engine of the motor vehicle is running there is an hydraulic failure in the braking system and the pressure falls below said upper level, the control system operates to start the pump and try to build up the pressure again. If, however, the pressure continues to fall there is no point in allowing the pump to continue to operate when it is having no effect. According to yet another feature of the invention, therefore, needless operation of the pump is avoided by arranging the logic control means so that if the pressure falls below said predetermined minimum level with the engine running the pump is stopped. Once the engine is stopped with the braking system in this condition the engine cannot be started again as the pump cannot build up the required predetermined minimum pressure in the braking system.

According to a further feature of the invention the control system is adapted to control the electric pump in an hydraulically powered brake anti-locking system, such as disclosed in our co-pending British Pat. application No. 45705/69, so as to maintain a predetermined minimum pressure therein. Typically, the fluid requirement of the hydraulic power circuit of the anti-locking system is greater than that of the braking system so that operation of the former is more critical in that it results in a quicker loss of pressure in the circuit. The logic control means is, therefore, adapted to give priority to the pump of the anti-locking system over the pump of the braking system, a control signal being derived from the anti-locking system which under all conditions over-rides operation of the brake pump and operates the anti-locking pump when necessary. The general order of priorities in the control system is, therefore, first to allow operation of the anti-locking pump, second to allow operation of the brake pump, and third to allow operation of the starter motor, no more than one of these units being allowed to operate at any time in order to protect the conventional 12 volt battery which supplies power to them all, from being overloaded.

The invention is now described by way of example with reference to the accompanying drawings in which.

Figure 2:
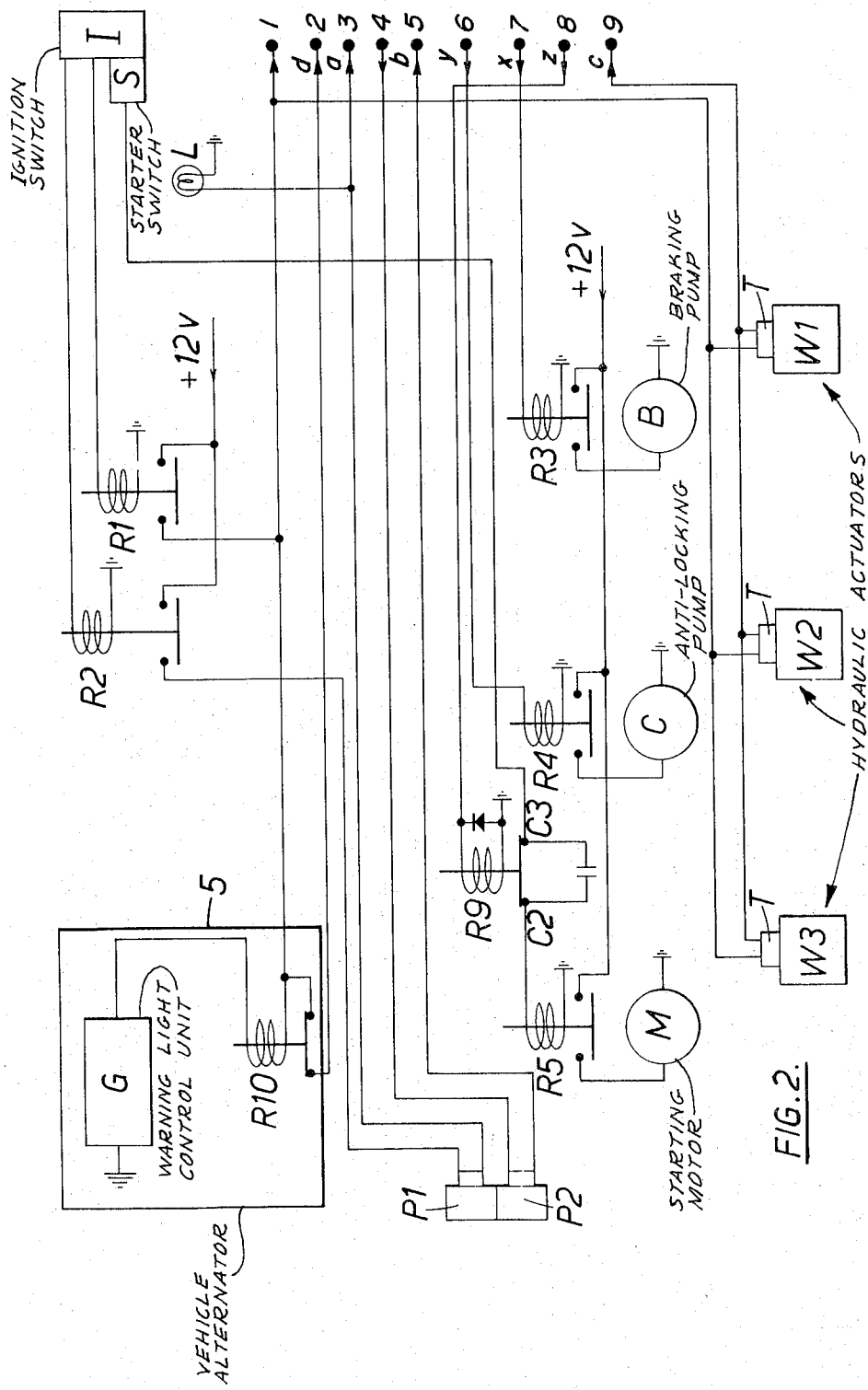
FIG. 2 is a circuit diagram of that part of the control system which is associated directly with the electrical starting system and hydraulic braking and anti-locking systems of the motor vehicle.
Figure 3:
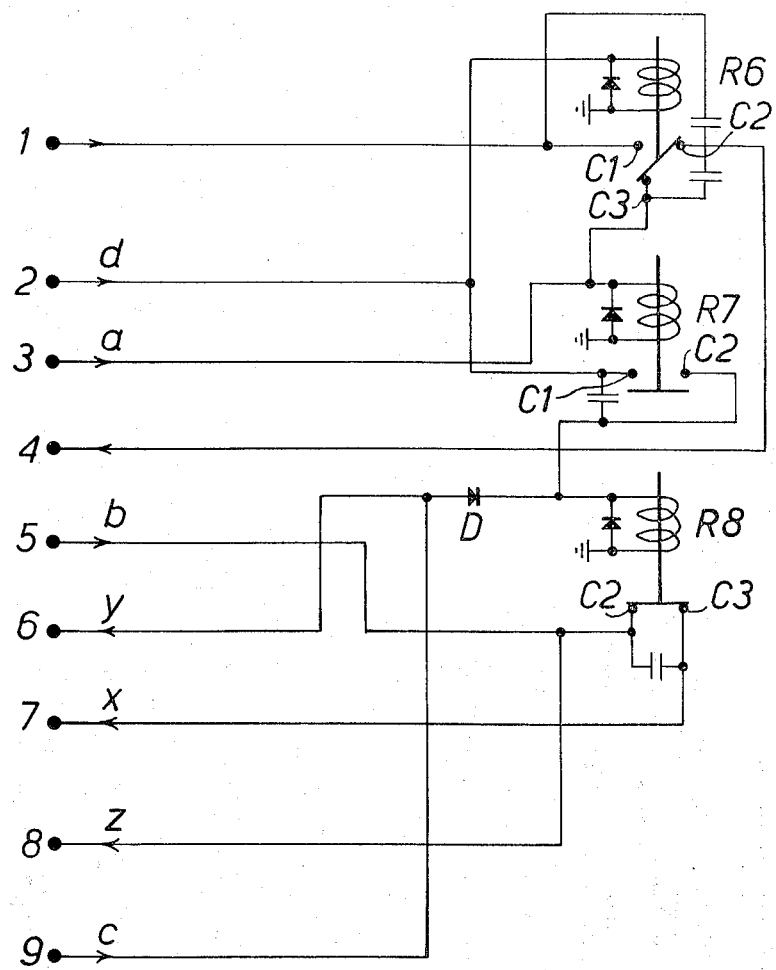
FIG. 3 is a circuit diagram of the logical part of the control system which provides the actual control signals.

The manner in which the two parts of the control system shown in FIGS. 2 and 3 are interconnected is indicated by the numbered connection terminals down the left-hand side of each.

Figure 1:
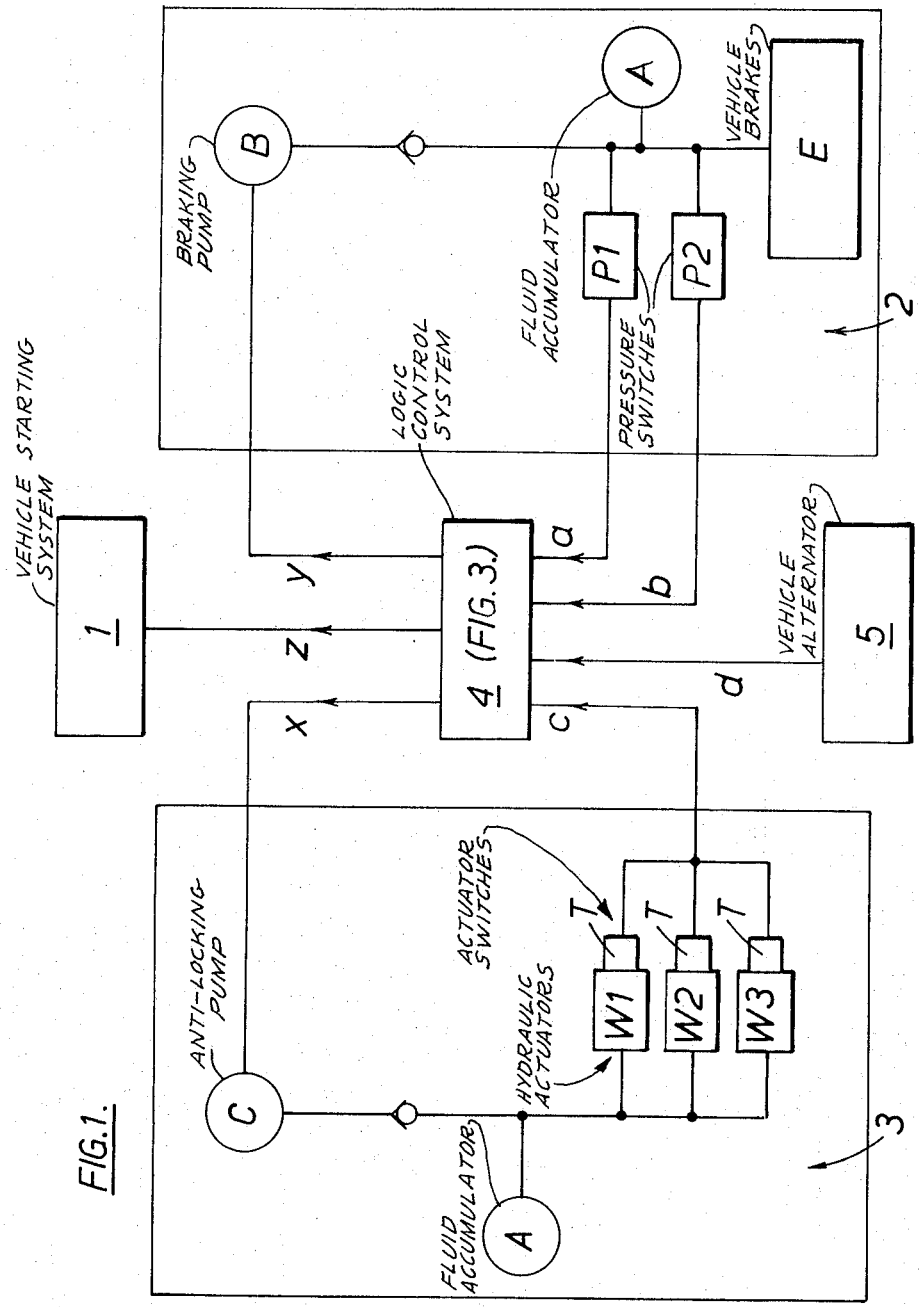
FIG. 1 is a schematic diagram of a control system for a motor vehicle according to the invention.

The electrical starting system, hydraulic braking system and hydraulic brake anti-locking system of the vehicle are represented by the blocks referenced 1, 2 and 3 respectively, in FIG. 1. The starter motor M in the starting system 1 and pumps B and C in the hydraulic braking and anti-locking systems 2, 3 are all powered by the 12 volt vehicle battery, and are controlled by the control systems according to the invention so that the motor and pumps operate one at a time and according to predetermined operating priorities where there is a demand for two or more of these devices to operate at the same time. The actual control signals which operate the motor and pumps are produced by the logical control section of the control system, which is represented by the block referenced 4. This section 4 operates in response to input signals from the braking and anti-locking systems 2, 3 and from the vehicle alternator represented by the block referenced 5, the signals from the systems 2, 3 being representative of hydraulic pressures in those systems and the signal from the alternator being indicative of whether or not the latter is operating. The circuitry of the logical control section 4 is shown in FIG. 3, and the input and output connections between this section 4 and the starting system 1, hydraulic systems 2, 3 and alternator 5 are shown in FIG. 2.

The electrical starting system 1, as shown in FIG. 2, comprises the ignition switch 1 which incorporates a starter switch S and the starter motor M, the starter switch S being connected to the operating relay R5 of the starter motor M through the contacts C2, C3 of a relay R9 so that operation of the ignition switch I and starter switch S will energise the relay R5 to start the starter motor M if the relay R9 is de-energised.

The hydraulic braking system 2 comprises the electric pump B which pumps fluid into an accumulator A to provide a pressurised supply of fluid for the brakes E. The pump B is operated through energisation of its operating relay R3 by signals from the logical control section as further described below. Two pressure switches P1 and P2 are provided in the pressurised supply side of the pump B to sense the pressure in the system and are connected in input connections to the logical control section as shown. The pressure switch P1 closes at pressures below 1,200 pounds/square inch and it open at higher pressures, and the pressure switch P2 closes at pressures below 2,500 pounds/square inch and is open at higher pressures. It will be appreciated that these pressure levels are nominal values and that different levels may be required in different braking systems.

The hydraulic anti-locking system 3 comprises three hydraulically operated actuators W1, W2 and W3, the first two of which control operation of the brakes on the front wheels independently of one another, and the third of which controls operation of the brakes on the rear wheels of the motor vehicle. Hydraulic pressure to operate the actuators is provided by a hydraulic power circuit which includes an electric pump C. Each actuator has its own accumulator and these are all represented by the one accumulator A in FIG. 1. Individual actuator switches T are connected to each of the actuators so as to be triggered when the actuators demand fluid as a result of a fall in fluid pressure and the switches T then deliver an output signal to the logical control section which in turn produces a control signal to energize the operating relay R4 of the pump C and restore the required pressure level in the actuators.

The alternator 5 comprises a warning light control unit G and a relay R10 as shown in FIG. 2. The unit G acts as a switch which is closed when the alternator is not charging the vehicle battery but which opens when the alternator is charging the vehicle battery, and which controls energisation of the relay R10 so that the normally closed contacts of the relay are opened preventing the passage of an output signal when the alternator is not charging but remain closed and permit the passage of an output signal when the alternator is charging, which signal is supplied to the logical control section.

Starting from a condition in which the pressure in the braking system 2 is below 1,200 pounds/square inch, which means that both of the pressure switches P1 and P2 are closed, the ignition switch I is operated as a first step in starting the motor vehicle. Operation of the ignition switch I supplies a signal to the starter switch S and energises two relays R1 and R2. Energisation of the relay R1 passes a 12 volt signal to the alternator 5 and because the alternator is not charging, the unit G completes a circuit to earth which energises the relay R10 and interrupts the alternator output signal to the logical control section. Energisation of the relay R1 also passes a 12 volt signal to the actuator switches T and to the contact C1 of a two-way relay R6 which is de-energised at this time and which therefore closes the other contacts C3 and C2. Energisation of the relay R2 passes a 12 volt signal through the closed pressure switch P1, through the closed contacts C3 and C2 of the two-way relay R6, through the closed pressure switch P2, through the closed contacts of a de-energised relay R8 and on to the operating relay R3 of the pump B to energise it and start the pump. In passing through this circuit, this same 12 volt signal from the relay R2 also energises a relay R7 to close its contacts C1 and C2 and energises the relay R9 to open its contacts C2 and C3. Energisation of the relay R7 serves to connect the output of the alternator 5 to the winding of the relay R8 but as the alternator is not charging and its output signal is interrupted by the relay R10, the relay R8 remains deenergised. Energisation of the relay R9 serves to break the circuit between the starter switch S and the operating relay R5 of the starter motor to prevent operation of the latter even if the starter switch S is operated at this time.

The pump B is now operating and assuming that there is not a hydraulic failure in the braking system the pressure builds up. At a pressure of 1,200 pounds/square inch the pressure switch P1 opens breaking the circuit from the relay R2 to the operating relay R3 of the pump B and the pump stops. Also, the relays, R7 and R9 are de-energised, the contacts of relay R7 being opened to disconnect the alternator output from the relay R8, and the contacts of relay R9 being closed to connect the starter switch S to the operating relay R5. Because of this last condition the starter switch S can now be operated to start the starter motor M and thereby start the engine. As soon as the engine is running the alternator 5 starts to charge the vehicle battery and delivers an output signal which energises the relay R6 and switches it to its second position closing the contacts C1 and C2. This makes a circuit from the contacts of relay R1, through the still closed pressure switch P2, and closed contacts of the relay R8 to the operating relay R3 of the pump B so that a 12 volt signal battery energises the relay R3 and starts the pump B again. The pressure now builds up from 1,200 pounds/square inch to 2,500 pounds/square inch at which latter level the pressure switch P2 opens to break the circuit and stop the pump B.

If while the engine is running there is a hydraulic failure, the pressure switch P2 will close when the pressure falls below 2,500 pounds/square inch and the pump B will be started again by the signal from the relay R1. If the pressure continues to drop the pressure switch P1 will close below a pressure of 1,200 pounds/square inch and will pass a 12 volt signal from the contacts of relay R2 to the relay R7 to energise the latter and cause it to close its contacts. The output signal from the alternator will then energise relay R8 opening its contacts and breaking the circuit to the operating relay R3 of the pump B so that the pump is stopped and does not needlessly pump hydraulic fluid out of the system and become damaged itself. Once the engine is stopped with the hydraulic braking system in this condition, the engine cannot be started again without the hydraulic failure being repaired first. Operation of the ignition switch I will operate the pump B through both pressure switches as already described above, but pressure will not build up to stop the pump, and all the time that the pump B operates it inhibits operation of the starter motor M by energising the relay R9 and breaking the circuit between the starter switch S and the operating relay R5 of the starter Motor M.

All low pressure and failure conditions in the hydraulic braking system are indicated by a warning light L.

Having considered how the control system responds to control the starter motor M and pump B of the hydraulic braking system we can now consider how the control system responds to control the pump C in the hydraulic power circuit of the anti-locking system 3. As already described above, operation of the ignition switch I energises the relay R1 and the battery supplies a 12 volt signal to the actuator switches T. At any time thereafter if the pressure supplied to the actuators W1, W2 and W3 falls, one or more of the actuator switches passes a signal to the control system which passes through a diode D to the relay R8 to energise the latter and open its contacts to stop the pump B if it was operating at that time, and which energises the operating relay R4 of the pump C so as to start the pump C. The pump then continues to operate until the pressure builds up to the required level at which level the actuator switches T break the circuit to stop the pump C.

The control system, therefore, gives priority to the operation of the pump C and allows it to be operated at any time after the ignition switch I is operated. As an exception to this the pump C cannot be operated while the starter switch S is actually operated. This arises because operation of the starter switch interrupts the signal from the ignition switch I to the relay R1 which de-energised the relay R1 and in turn interrupts the 12 volt signal from the battery to the actuator switches T. Operation of the actuator switches T cannot then supply a demand signal to the control system to initiate operation of pump C. However, as soon as the engine is started release of the starter switch energises relay R1 again and the pump C can be operated by a signal from the actuators switches T.

The capacitors and diodes connected across the contacts and solenoid windings of the relay R6, R7, R8 and R9 of the control system are provided to suppress any voltage spikes which might be generated by operation of the relays. It is particularly important to do this when using the control system with an anti-locking system which, as disclosed in our above mentioned co-pending patent application, has an electronic control unit which might respond to such spurious voltage spikes.

An alternative embodiment of the invention may comprise a control system similar to that illustrated but which is modified so that absolute priority is given to the anti-locking pump C over the starter motor M as well as the brake pump B. There are basically two modifications which comprise first modifying the ignition switch I and starter switch S so that operation of the starter switch S does not interrupt the signal from the ignition switch I to the relay R1, and second modifying the logical control section 4 so that when it produces the output signal to operate the anti-locking pump C it simultaneously produces the output signal to inhibit operation of the starter motor M. The pump C and starter motor are then interlocked like the pump B and starter motor, and any attempt to operate the starter motor by use of the starter switch S does not interrupt operation of pump B as in the illustrated system.

Preferably, the logical control section in this alternative embodiment comprises electronic gating circuitry which is formed by a plurality of interconnected solid-state logic gates, and which has four inputs to receive input signals $a$, $b$, $c$ and $d$, and which has three outputs to deliver output signals $x$, $y$ and $z$, where $a$ and $b$ are the input signals which indicate that the pressure in the braking system is below 300 and 1,200 p.s.i. respectively, $c$ is the input signal which indicates that the pressure in the anti-locking system is below 2,500 ps.i., and $d$ is the input signal which indicates that the alternator is charging (i.e. the engine is running); and where $x$ is the output signal which operates pump B, $y$ is the output signal which operates pump C, and $z$ is the output signal which inhibits the starter motor M. The connections for these signals are correspondingly referenced in FIG. 1.

The logical control section 4 would be such that it had a logical response pattern as follows:

$$y \rightarrow c$$
$$x \rightarrow a \cdot b \cdot \bar{c} \cdot \bar{d} \text{ or } \bar{a} \cdot b \cdot \bar{c} \cdot d$$
$$z \rightarrow x \text{ or } y \text{ or } a$$

These patterns are exclusive, that is, the output on the left hand side of each is only produced when the corresponding conditions exist as shown on the right hand side of each pattern, and under no other conditions.

I claim:

1. An electric control system for a motor vehicle comprising a vehicle starter motor, an electrically operated pump associated with a vehicle hydraulic braking system; an electrical power circuit for the starter motor and pump; switch means connected in said electrical power circuit which normally serves to stop the pump and permit operation of the starter motor but can be operated to start the pump and prevent operation of the starter motor; first pressure sensing means which senses the hydraulic pressure produced by the pump in the braking system and which produces an output signal only when the hydraulic pressure sensed falls below a predetermined minimum level; and logic control means which has a first input connection from the first pressure sensing means to receive said output signal therefrom and which has output connection means to said switch means, the logic control means being such that it responds to said output signal at the first input connection by applying an output signal through the output connection means to the switch means which operates the latter, thereby starting the pump and preventing operation of the starter motor.

2. A system as claimed in claim 1 in which the power circuits of the starter motor and pump are powered by the same battery.

3. An electrical control system for a motor vehicle comprising a vehicle starter motor, an electrically operated pump associated with a vehicle hydraulic braking system; an electrical power circuit for the starter motor and pump; switch means connected in said electrical power circuit which normally serves to stop the pump and permit operation of the starter motor but can be operated to start the pump and prevent operation of the starter motor; first pressure sensing means which senses the hydraulic pressure produced by the pump in the braking system and which produces an output signal only when the hydraulic pressure sensed falls below a predetermined minimum level; second pressure sensing means which senses the hydraulic pressure produced by the pump in the braking system and which produces an output signal only when the hydraulic pressure falls below a predetermined level above said predetermined minimum level; means which is associated with a vehicle engine and which produces an output signal only when the engine is running; and logic control means which has a first input connection from the first pressure sensing means to receive said output signal therefrom, a second input connection which is adapted to receive said output signal from the second pressure sensing means, a third input connection which is adapted to receive said output signal from said means associated with the engine, and output connection means to said switch means, the logic control means being such that it responds to said output signal at the first input connection and responds to the simultaneous application of said output signals at the second and third input connections by applying an output signal through the output connection means to the switch means which operates the latter, thereby starting the pump and preventing operation of the starter motor.

4. A system as claimed in claim 3 in which the switch means comprises first switch means connected in the electrical power circuit of the starter motor and separate second switch means connected in the power circuit of the pump, and in which the output connection means between the logic control means and switch means comprise a separate output connection to each of said separate switch means.

5. A system as claimed in claim 4 in which the logic control means is such that, in the absence of said output signal at the first input connection, it responds to the simultaneous application of said output signals at the second and third input connections by applying an output signal to said first switch means which causes the latter to operate and prevent operation of the starter motor, and by applying an output signal to said second switch means which causes the latter to operate and start the pump; and in which the logic control means is further such that, when said output signals are applied to said first, second and third input connection simultaneously, it responds by applying said output signal to said first switch means which causes the latter to operate and prevent operation of the starter motor, and by applying an output signal to said second switch means which causes the latter to operate and stop the pump.

6. A system as claimed in claim 3 in which said means which is associated with a vehicle engine and which produces an output signal only when the engine is running is a vehicle alternator.

7. A system as claimed in claim 4 which further comprises an electrically operated pump associated with a vehicle hydraulic brake anti-locking system; an electrical power circuit for this anti-locking pump; third switch means connected in said electrical power circuit of the anti-locking pump; and third pressure sensing means which senses the hydraulic pressure produced by the pump in the brake anti-locking system and which produces an output signal only when the hydraulic pressure sensed falls below a predetermined minimum level; the logic control means having a fourth input connection which is adapted to receive said output signal from the third pressure sensing means and having an output connection to said third switch means, the logic control means being such that it responds to said output signal at the fourth input connection by applying an output signal to the third switch means which signal operates the latter and thereby operates the anti-locking pump, and further being such that it cannot produce output signals to operate the two pumps simultaneously.

8. A system as claimed in claim 7 in which the logic control means is such that when it applies an output signal to the third switch means to operate the anti-locking pump it also prevents the possibility of said output signal being passed to said switch means connected in the power circuit of the brake pump which would operate the latter.

9. A system as claimed in claim 7 in which the power circuits of the starter motor and pumps are powered by the same battery.

* * * * *